(12) United States Patent
Gladney et al.

(10) Patent No.: US 8,045,246 B2
(45) Date of Patent: Oct. 25, 2011

(54) METHOD AND APPARATUS FOR BULK ERASURE IN A HOLOGRAPHIC STORAGE SYSTEM

(75) Inventors: Glenn A. Gladney, Manalapan, NJ (US); Marvin Hutt, Oakland, NJ (US)

(73) Assignee: Access Optical Networks, Inc., Manalapan, NJ (US)

( * ) Notice: Subject to any disclaimer, the term of this patent is extended or adjusted under 35 U.S.C. 154(b) by 0 days.

(21) Appl. No.: 12/818,507

(22) Filed: Jun. 18, 2010

(65) Prior Publication Data

US 2010/0321749 A1 Dec. 23, 2010

Related U.S. Application Data

(60) Provisional application No. 61/218,220, filed on Jun. 18, 2009.

(51) Int. Cl.
*G03H 1/26* (2006.01)
*G11B 7/00* (2006.01)

(52) U.S. Cl. .......................................... 359/22; 369/103

(58) Field of Classification Search ................. 359/1, 10, 359/22, 24, 35; 369/103
See application file for complete search history.

(56) References Cited

U.S. PATENT DOCUMENTS

| | | | |
|---|---|---|---|
| 3,703,328 A | 11/1972 | Glass et al. | |
| 3,799,642 A | 3/1974 | Phillips et al. | |
| 3,873,179 A | 3/1975 | Burke | |
| 4,012,108 A | 3/1977 | Ishii et al. | |
| 4,244,045 A | 1/1981 | Nosu et al. | |
| 4,449,785 A | 5/1984 | Huignard et al. | |
| 4,750,153 A | 6/1988 | Owechko et al. | |
| 5,132,811 A | 7/1992 | Iwaki et al. | |
| 5,357,359 A | 10/1994 | Uchiyama et al. | |
| 5,422,873 A | 6/1995 | Kewitsch et al. | |
| 5,450,218 A | 9/1995 | Heanue et al. | |
| 5,493,628 A * | 2/1996 | Lawandy | 385/122 |
| 5,550,779 A | 8/1996 | Burr et al. | |
| 5,717,508 A | 2/1998 | Stoll | |
| 5,877,875 A | 3/1999 | Reis et al. | |
| 5,999,287 A | 12/1999 | Davies et al. | |
| 6,023,352 A | 2/2000 | Haskal | |
| 6,026,053 A | 2/2000 | Satorius | |
| 6,031,643 A | 2/2000 | Burr | |
| 6,061,154 A | 5/2000 | Campbell et al. | |
| 6,088,321 A | 7/2000 | Yamaji et al. | |
| 6,154,432 A * | 11/2000 | Faruqi et al. | 369/103 |
| 6,166,835 A | 12/2000 | Yang | |
| 6,256,281 B1 | 7/2001 | Tanaka et al. | |
| 6,272,095 B1 | 8/2001 | Liu et al. | |
| 6,320,683 B1 | 11/2001 | Ito et al. | |
| 6,373,806 B1 | 4/2002 | Kitamura et al. | |

(Continued)

OTHER PUBLICATIONS

Ashley, J. et al. "Holographic Data Storage," IBM Journal of research & Development, vol. 44, No. 3, pp. 341-368, May 2000.

(Continued)

*Primary Examiner* — Alessandro Amari

(74) *Attorney, Agent, or Firm* — Knoble Yoshida & Dunleavy, LLC

(57) ABSTRACT

A method and system for bulk erasing in a holographic storage system is disclosed. The method may involve illuminating the entire volume storage region of a photorefractive crystal with a laser to achieve bulk erasure, or may involve selective erasure of a portion of a single written page. For bulk erasure of the entire photorefractive crystal the use of a separate laser or an incoherent light source is used.

18 Claims, 16 Drawing Sheets

U.S. PATENT DOCUMENTS

| | | | |
|---|---|---|---|
| 6,424,773 | B1 | 7/2002 | Watanabe |
| 6,477,300 | B2 | 11/2002 | Watanabe et al. |
| 6,535,472 | B1 | 3/2003 | Lee et al. |
| 6,556,531 | B1 | 4/2003 | Yagi et al. |
| 6,594,220 | B1 | 7/2003 | Matsushita et al. |
| 6,665,480 | B2 | 12/2003 | Watanabe |
| 6,686,097 | B2 | 2/2004 | Lahrichi |
| 6,760,524 | B2 | 7/2004 | Mukai |
| 6,819,845 | B2 | 11/2004 | Lee et al. |
| 6,853,774 | B2 | 2/2005 | Watanabe |
| 6,859,293 | B2 | 2/2005 | Klug et al. |
| 6,906,838 | B2 | 6/2005 | Hoen et al. |
| 6,961,499 | B2 | 11/2005 | Lee et al. |
| 6,987,607 | B2 | 1/2006 | Watanabe |
| 6,999,397 | B2 | 2/2006 | Roh et al. |
| 7,005,669 | B1 | 2/2006 | Lee |
| 7,006,742 | B2 | 2/2006 | Takahashi et al. |
| 7,019,874 | B2 | 3/2006 | Park |
| 7,020,372 | B2 | 3/2006 | Lee et al. |
| 7,072,549 | B2 | 7/2006 | Watanabe |
| 7,076,174 | B2 | 7/2006 | Watanabe et al. |
| 7,095,959 | B2 | 8/2006 | LoCascio et al. |
| 7,149,014 | B2 | 12/2006 | Chao et al. |
| 7,187,481 | B1 * | 3/2007 | Sigel et al. ............... 359/28 |
| 7,227,674 | B2 | 6/2007 | Klug et al. |
| 7,245,408 | B1 | 7/2007 | Huang et al. |
| 7,251,066 | B2 | 7/2007 | Chao et al. |
| 7,262,892 | B1 | 8/2007 | Yasuda et al. |
| 7,271,940 | B2 | 9/2007 | Klug et al. |
| 7,295,356 | B2 | 11/2007 | King |
| 7,336,413 | B2 | 2/2008 | Hasegawa et al. |
| 7,359,306 | B2 | 4/2008 | Matsumoto et al. |
| 7,423,564 | B2 | 9/2008 | Kitayama et al. |
| 7,507,504 | B2 | 3/2009 | Wu et al. |
| 2002/0001757 | A1 | 1/2002 | Lahrichi |
| 2002/0192566 | A1 | 12/2002 | Elliott et al. |
| 2006/0078803 | A1 | 4/2006 | Takizawa et al. |

OTHER PUBLICATIONS

Tien-Hsin Chao, "Compact Holographic Memory Using E—0 Beam Steering" (81 8)354-8614 Tien-Hsin.Chaoi & iol.nasa.nov. Hanying Zhou (8 1 S)354-0502 Hanving.

Hornbeck, L J., "Digital Light Processing for High-Brightness, High-Resolution Applications," SPIE Proceedings, vol. 3013, pp. 27ff, 1997.

Milanovic, V. et al. "Gimbal-Less Monolithic Silicon Actuators for Tip-Tilt-Piston Micromirror Applications," IEEE Journal of Selected Topics in Quantum Electronics, vol. 10, No. 3, pp. 462-471, May/Jun. 2004.

Mirrorcle Technologies, Inc., "Gimbal-Less Two-Axis Scanning Micromirrors," Data Sheet, 5 pages, 2009.

Staebler, D.L. et al. "Fe-Doped LiNbO3 for Read-Write Applications," Applied Optics, vol. 13, No. 4, pp. 788-794, Apr. 1974.

Staebler, D.L. et al. "Multiple Storage and Erasure of Fixed Holograms in Fe-Doped LiNbO3," Applied Physics Letters, vol. 26, No. 4, pp. 182-184, Feb. 15, 1975.

Huignard, J.P. et al. "Coherent Selective Erasure of Superimposed vol. Holograms in LiNbO3," Applied Physics Letters, vol. 26, No. 5, pp. 256-258, Mar. 1, 1975.

Huignard, J.P. et al. "Selective Erasure and Processing in vol. Holograms Superimposed in Photosensitive Ferroelectrics," Ferroelectrics, vol. 11, pp. 393-396, 1976.

Marrakchi, A. "Continuous Coherent Erasure of Dynamic Holographic Interconnects in Photorefractive Crystals," Optics Letters, vol. 14, No. 6, pp. 326-328, Mar. 15, 1989.

Sasaki, H., et al. "Fast Update of Dynamic Photorefractive Optical Memory," Optics Letters, vol. 17, No. 20, pp. 1468-1470, Oct. 15, 1992.

Sasaki, H., et al. "Dynamics of a Composite Grating in Photorefractive Crystals for Memory Application," Journal of the Optical Society of America A, vol. 11, No. 9, pp. 2456-2470, Sep. 1994.

Aguilar, M., et al. "Optimization of Selective Erasure in Photorefractive Memories," Journal of the Optical Society of America B, vol. 14, No. 1, pp. 110-114, Jan. 1997.

Sano, T. , et al. "Experiment on Selective Erasure for Multiplexed Holograms by Using Photorefractive Phase Shift," Paper CWAB3-P89, pp. 977-978, Proceedings of European Conference on Lasers and Electro-Optics, 2005.

Bunsen, M., et al. Selective Erasure of Holograms in Photorefractive and Photopolymer Materials for Rewritable and Secure Data Storage,: Japanese Journal of Applied Physics, vol. 46, No. 6B, pp. 3858-3861, 2007.

Bunsen, M., et al. "Improved Holographic Recording Techniques for Data-Page Rewriting,"Japanese Journal of Applied Physics, vol. 47, No. 7, pp. 5977-5980, 2008.

Saleh, B.E.A and Teich, M.C., "Fundamentals of Photonics" 2nd Edition, Wiley, 2007.

Milonni, P.W and Eberly, J.H., "Laser Physics", Wiley, 2010.

Connelly, M.J., "Semiconductor Optical Amplifiers", Kluwer, 2004.

Chow, W.W. And Koch, S.W., "Semiconductor-Laser Fundamentals", Springer, 1999.

Thompson, G.B.H., "Physics of Semiconductor Laser Devices", Wiley, 1980.

Sokoloff, J.P., Prucnal, P.R., Glesk, I. and Kane, M., "A Terahertz Optical Assymetric Demultiplexer (TOAD)", IEEE Photonics Technology Letters, 5 (7), p. 787-790, 1993.

Kang, K.I., Glesk, I., Chang, T.G., Prucnal, P.R. And Boncek, R.K., "Demonstration of All-Optical Mach-Zehnder Demultiplexer", Electronics Letters, 31 (9), p. 749-750, 1995.

Kang, K.I., Chang, T.G., Glesk, I. and Prucnal, P.R., "Comparison of Sagnac and Mach-Zehnder Ultrafast All-Optical Interferometric Switches based on a Resonant Optical Nonlinearity", Applied Optics, 35 (3), p. 417-426, 1996.

International Search Report dated Dec. 30, 2010 for corresponding PCT/US2010/039129 filed Jun. 18, 2010.

* cited by examiner

METHOD AND APPARATUS FOR BULK ERASURE IN A HOLOGRAPHIC STORAGE SYSTEM

This application claims the benefit of U.S. Provisional Patent Application No. 61/218,220 filed Jun. 18, 2009, the contents of which are incorporated by reference.

BACKGROUND OF THE INVENTION

1. Field of the Invention

The present invention relates to holography. In particular, the present invention is directed to a method and apparatus for bulk erasure in a holographic storage system.

2. Description of the Related Technology

Holographic techniques for storing images are well known. Such techniques are commonly used to store images in a variety of different applications. Holographic memory is a prospective technology for massive data storage, with the unique advantages of high storage density, fast read/write rate, non-volatility, and no moving parts. Ideally, holographic memory technology may be capable of storing hundreds of billions of bytes of data, transferring them at a rate of a billion or more of bits per second and selecting a randomly chosen data element in 100 microseconds or less.

To date, no state-of-the-art electronic memory technology offers all of the advantages that may be obtained with holographic memory. Dynamic Random Access Memory (DRAM) or Static Random Access Memory (SRAM) are both volatile and require constant refreshing. Electrically Erasable Programmable Read Only Memory (EEPROM) is nonvolatile and has read/write functionality, but it has less storage capacity and a very slow rewrite speed. FLASH memory is nonvolatile and has read/write capability but it too has less storage capacity.

Many devices (e.g., compact discs and digital video discs) use light to store and read data. However, prior art optical storage methods have limited transfer rates and capabilities. To overcome the disadvantages of the prior art, holographic memory may be used. Holographic memory stores information beneath the surface of the recording medium and uses the volume of the recording medium for storage. To date, holographic memory systems have been limited with respect to speed due to the need for re-encoding data and/or reading the data from the storage medium.

Holographic data storage is interesting from a business as well as scientific perspective. At least two companies today claim storage media capable of write once, read many (WORM) for storage markets such as video archival and medical applications. One company, Aprilis, Inc. (a division of STX Group), is producing 120 mm discs for which 400 GB storage capacity and 125 MB/s data transfer rate is claimed to be possible when used in a properly designed disc drive system. A second company, In-Phase Technologies (now controlled by Signal Lake), claims 300 GB and 20 MB/s in the near term with the hope to reach terabyte densities in the future.

While these companies are able to produce storage devices that can store much data, they are not able to achieve the data storage and access speeds needed for a commercially viable product.

Current holographic storage devices are typically record only and have no bulk erase capabilities. Therefore, current art electronic storage devices are slow to erase to a clean state, which, may be needed to meet requirements of some customers.

One way to bulk erase a holographic storage device is to temperature bulk erase. This is accomplished by removing the crystal from MUHCS storage device and placing the crystal in a dielectric holder. It is then inserted into a convection oven and the temperature is set to 200° C. for two hours. While this method may achieve erasure of the photorefractive crystal, it is not a timely or procedurally simple.

Therefore, there is a need in the field to provide bulk erasure in a holographic storage system that is not as time intensive as previous methods and/or procedurally complicated.

SUMMARY OF THE INVENTION

An object of the invention may be a holographic storage system having bulk erasure.

Yet another object of the invention may be a method of bulk erasing in holographic storage system using a laser.

An aspect of this invention may be a holographic storage system with bulk erasing comprising: a photorefractive crystal for storing and retrieving a plurality of pages; a first laser for providing a reference beam and a data beam for storing the plurality of pages on a photorefractive crystal; and a second laser for bulk erasing the plurality of pages.

Another aspect of the invention may be a method of bulk erasure in a holographic storage system comprising: providing a first laser; a photorefractive crystal; and a second laser; storing a plurality of pages with the first laser on the photorefractive crystal; illuminating the photorefractive crystal with the second laser, wherein the illumination bulk erases the plurality of pages.

Still yet another aspect of the invention may be a holographic storage system with bulk erasing comprising: a photorefractive crystal for storing and retrieving a plurality of pages; a first laser for providing a reference beam and a data beam for storing the plurality of pages on a photorefractive crystal; and a second laser for bulk erasing the plurality of pages; a digital micro-mirror device for reflecting the data beam; a Micro-Electro-Mechanical Systems angle generating optical assembly for angle-multiplexing the reference beam; a camera for reading out the plurality of pages; and wherein a plurality of pages on the photorefractive crystal are removed after operation of the second laser.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
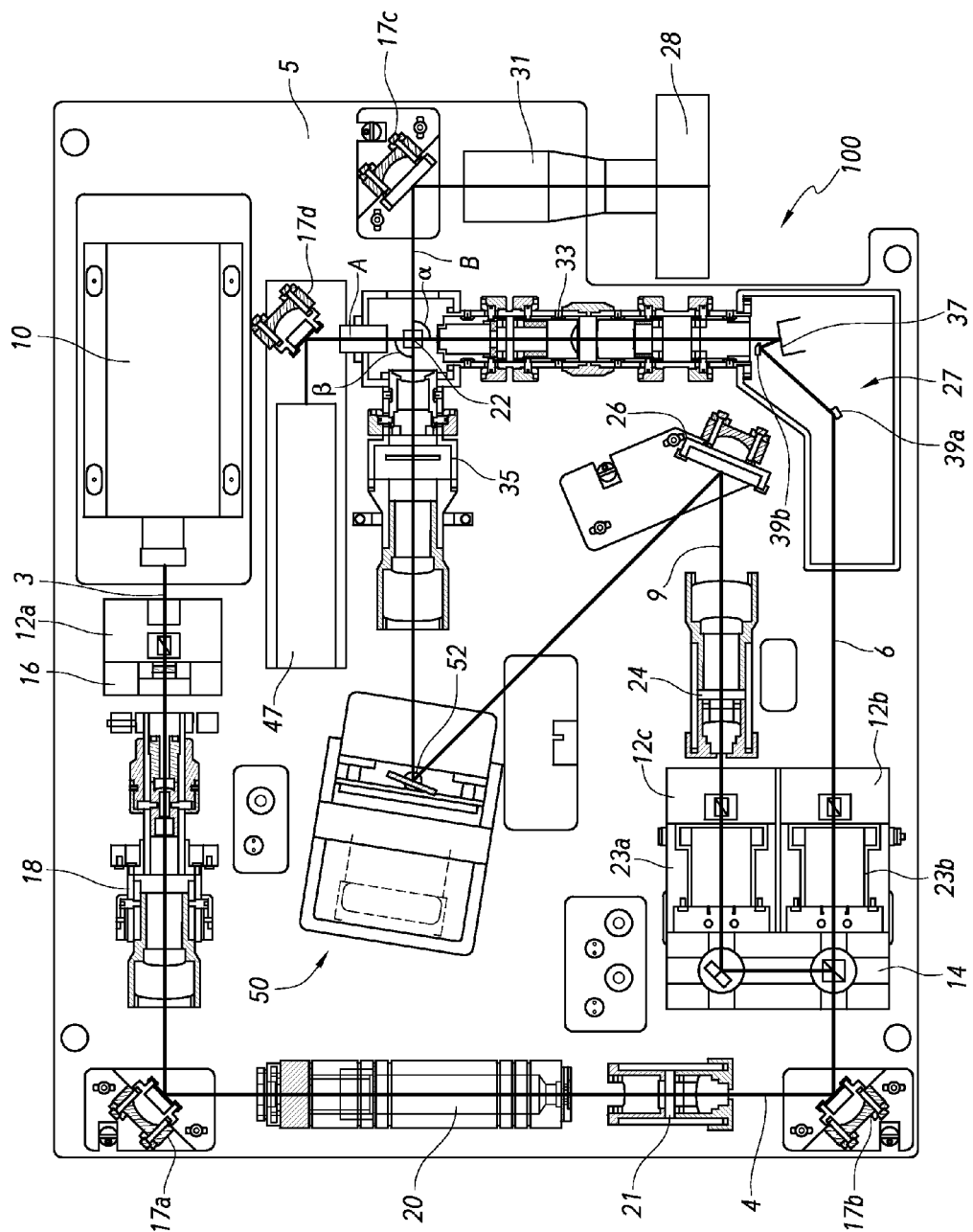
FIG. 1 shows a schematic diagram of a holographic storage system using a one quadrant dual-axis MEMS mirror, in accordance with an embodiment of the invention.
Figure 2:
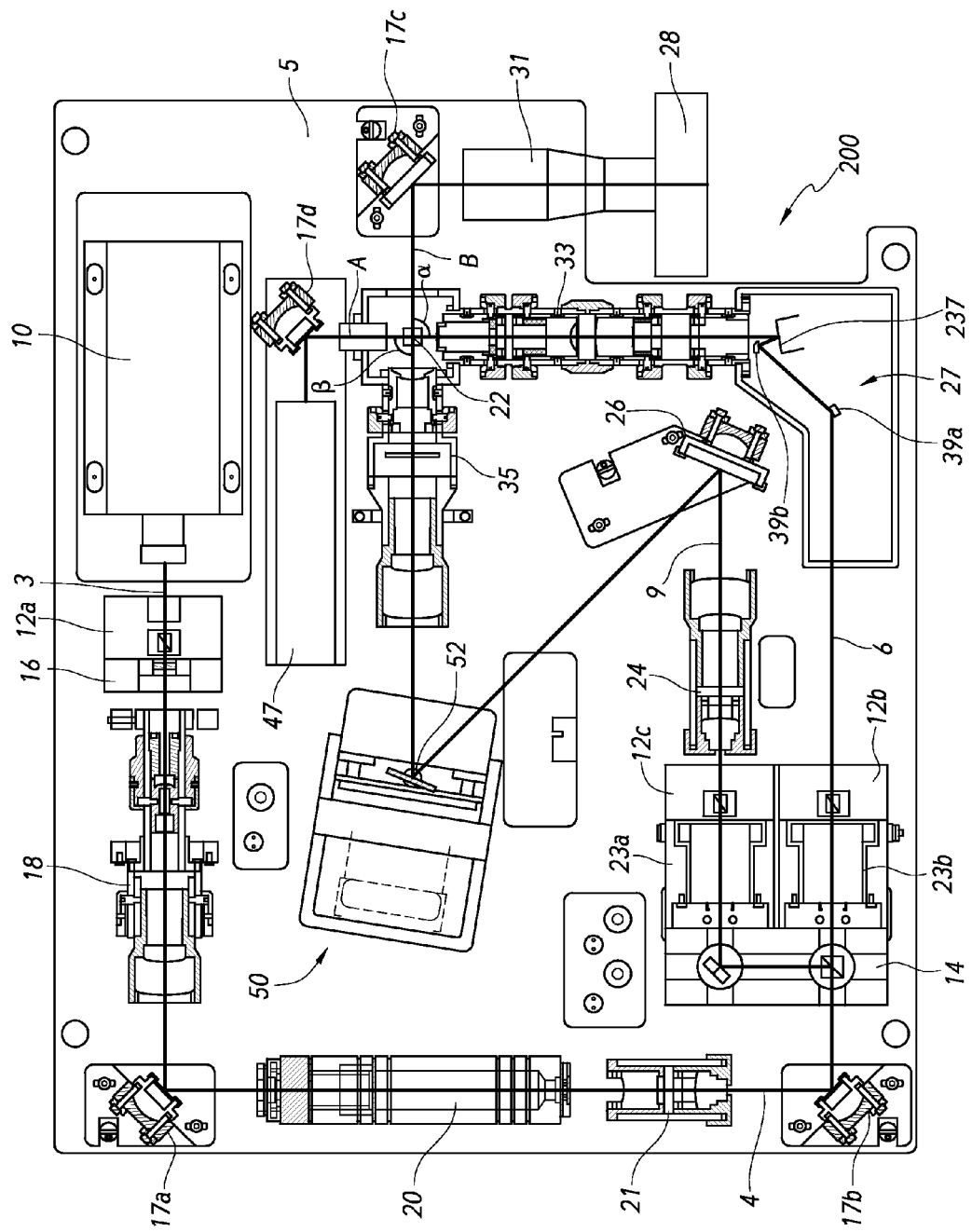
FIG. 2 shows a schematic diagram of a holographic storage system using a four quadrant dual-axis MEMS mirror, in accordance with an embodiment of the invention.

FIGS. 1 and 2 show holographic storage systems 100 and 200 respectively. All like numbered elements perform the same function throughout the Application and with the holographic storage systems 100 and 200. All references to and discussions of holographic storage system 100 also applies to the holographic storage system 200. The only differences between the two systems are noted in the body of the specification below and shown in the drawings which accompany this application.

The holographic storage system 100 comprises components placed on a board 5 and that uses a doped photorefractive crystal 22, which may be doped with iron. The photorefractive crystal 22 may be illuminated by two laser beams, a data beam 9 and reference beam 6. The data beam 9 and the reference beam 6 are generated by a laser 10. The photorefractive crystal 22 is then referenced so as to form a holographic data page 40 in the photorefractive crystal 22.

The holographic storage system 100 of the present invention has demonstrated a potential for achieving 1.3 TeraByte data storage in a single volumetric storage media with access speeds in excess of 1 Gigabit per second. In order to achieve such quality storage a feature of the holographic storage system 100 is a angle-generating optical assembly 27.

In the embodiment shown in FIG. 1, the holographic storage system 100 comprises a laser 10. The laser 10 shown in FIG. 1 is a frequency-doubled Neodymium laser producing continuous power output of 1.1 Watts at a wavelength of 532 nanometers with an optical coherence length of better than 1 meter, into a lowest-order Gaussian TEM transverse mode beam. Alternatively, a semiconductor laser source may achieve similar results.

The holographic storage system 100 may further comprise external linear polarizers 12a, 12b and 12c. The external linear polarizers 12a-12c improve the contrast ratio of approximately 100:1 of the original beam 3 coming directly from the laser 10 to a value of approximately 10,000:1. This renders the polarized light defined as horizontal with respect to the plane of the entire holographic storage system 100.

The holographic storage system 100 may also comprises a beam filter 16. The beam filter 16 removes unwanted diffraction effects from the original beam 3 from the laser 10.

The holographic storage system 100 may also comprise a variable beam expanding telescope 18. The variable beam expanding telescope 18 determines the size of the laser beam as it passes through the rest of the holographic storage system 100.

The holographic storage system 100 may also comprise plane mirrors 17a, 17b, 17c and 17d. The plane mirrors 17a-17d redirect the laser beams at 90° angles.

The holographic storage system 100 may also comprise a special laser beam profile generator 20. The laser beam profile generator 20 converts the fundamental Gaussian $TEM_{oo}$ transverse mode beam emitted from the laser 10 into a plane wave output, within an overall tenth-wave accuracy.

The holographic storage system 100 may also comprise a beam expander 21 that in the present invention is used in reverse to render a horizontally polarized beam 4 that is now less than 3 millimeters in diameter.

The holographic storage system 100 may also comprise a beamsplitter 14. The polarized beam 4 emitted by the beam expander 21 is reflected by the plane mirror 17b in order to direct the beam into the beamsplitter 14. The beamsplitter 14 divides the beam 50/50 into two separate, horizontally polarized beams. Each of the two beams is directed into a pair of electro-optic modulators, 23a, 23b and through the linear polarizers 12b and 12c. The beams now form the data beam 9 and the reference beam 6.

Figure 5:
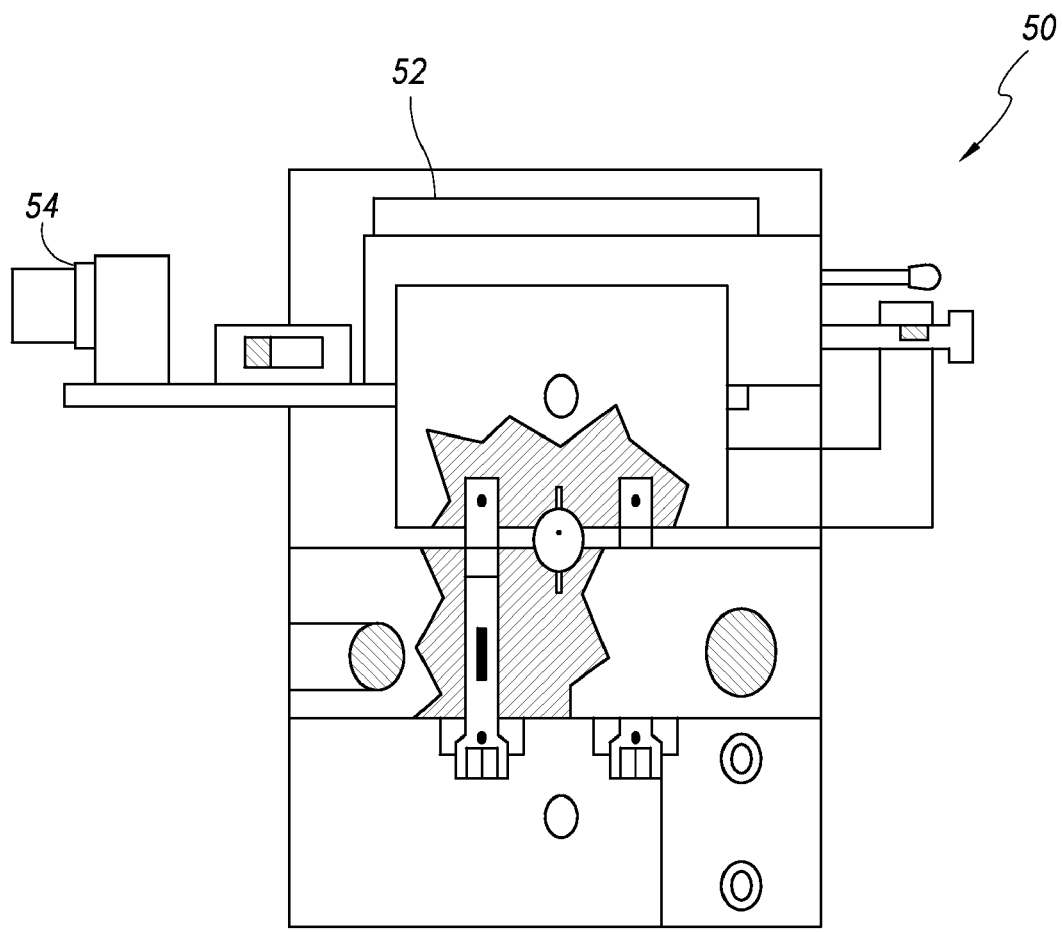
FIG. 5 shows a MEMS mirror assembly used in the holographic storage system shown in FIGS. 1 and 2.

The holographic storage system 100 may also comprise an up-collimating telescope 24, which takes the data beam 9 and directs it onto a data mirror assembly 26, which may be a spatial light modulator. The data mirror assembly 26 will then direct the data beam 9 to the digital micro-mirror device 52. Specifically, digital micro-mirror device 52 may be a Texas Instruments Digital Micro-mirror Device MEMS type SXGA.95. This device contains the large array of micro-mirrors 25 that operate in a binary system to switch the data beam to individual "ON" or "OFF" signals that either reach the $LiNbO_3$ photorefractive crystal 22, discussed below. FIG. 5 shows the data minor assembly 50 which comprises the digital micro-minor device 52. The data minor assembly 50 provides X-axis, Y-axis, Polar axis and Azimuthal axis adjustment and is driven by the assembly driver 54.

The holographic storage system 100 may also comprise a data projector 35. The data projector 35 conditions the data beam 9 and projects it onto one face of the photorefractive crystal 22.

The holographic storage system 100 may also comprise an angle-generating optical assembly 27. The reference beam 6 is transmitted from the beamsplitter 14 through the electro-optic modulator 23b and the linear polarizer 12b to the angle-generating optical assembly 27. The angle-generating optical assembly 27 comprises a 45° optical assembly mirror 37, which further comprises feedback sensing in addition to two sub optical assembly mirrors 39a and 39b to limit the span of the MEMS micro-minor 37 or 237. The MEMS micro-minor 237 is a four-quadrant MEMS type device with a single minor driven by combs of electrostatic actuators. In an embodiment of the invention a MirrorcleTechnology beam steering mirror capable of +/−4.5 degrees in both "X" and "Y" axis directions of the reference beam 6.

The holographic storage system 100 may also comprise a reference beam steering device 33. Reference beam steering device 33 is used to steer the reference beam 6 onto the photorefractive crystal 22 at 90° with respect to the direction of the data beam 9.

The holographic storage system 100 may also comprise a photorefractive crystal 22, which may be comprised of $LiNbO_3$ and be placed in a housing. Other materials for photorefractive crystals 22 that may be used are Lithium Tantalate ($LiTaO_3$), which is similar to Lithium Niobate, Barium Titanate ($BaTiO_3$); which has a different structure and does not work by the same mechanism, i.e. not photovoltaic; Potassium Tantalate Niobate (KTN) which is not as easily grown; Sodium Barium Niobate (SBN), and Barium Germanate Oxide (BGO).

The holographic storage system 100 may also comprise a camera 28, which may be a Complementary metal-oxide-semiconductor (CMOS) array. The camera 28 is used to read out the holographically stored information when only the reference beam 6 is used and with the original data beam 9 switched off. The holographic storages system 100 is connected to a controller 300 shown in FIG. 14 and discussed below. The data page 40 is accessed using the camera 28 by using the encode/decode logic 314, which selects the page number and the cluster. The page control logic 316 drives the micro-mirror 37 to the proper X and Y angles so that the selected data page 40 will be illuminated by the reference beam 6. The angle-generating optical assembly 27 selects the rows where that cluster is stored and sends this information to the camera 28 as the Window. A Read/Write pulse is generated which causes the photorefractive crystal 22 to be illuminated by the reference beam 6. While the photorefractive crystal 22 is being illuminated, the camera 28 issues a capture pulse which causes the camera 28 to capture the entire Page. The camera 28 downloads those rows specified by the window. The embodiment shown uses the Cypress LUPA 1300-2. The 10-bit pixels are downloaded in 12 serial data streams with a sync channel. The camera 28 then aligns the pixels. The pixels are then fed into a threshold detector where they are first converted into bits and then concatenated into bytes. For the initial system, there are 2 levels and 1 bit. For gray scale systems, 4 levels will be output as 2 bits; 16 levels as 4 bits, etc. The bytes are then sent to the Forward Error Correction (FEC) Decode Logic where any errors that were introduced in writing, storing or reading the data are removed. The data is then sent to the System Interface (which is a SATA interface in the current configuration) where it is then sent to a host computer.

The holographic storage system 100 may also comprise a camera 28, which may be a Complementary metal-oxide-semiconductor (CMOS) array. The camera 28 is used to read out the holographically stored information when only the reference beam 6 is used and with the original data beam 9 switched off.

The holographic storage system 100 may also comprise a second laser 47 used only for bulk erasure of the entire photorefractive crystal 22.

The bulk erasure of the entire photorefractive crystal 22 removes all the data and involves the second laser 47 illuminating the photorefractive crystal 22 with unpolarized light at a range of divergence angles, which includes the whole range of address angles [−6° through +6° external to the crystal, both alpha and beta, 4.5°. The second laser 47 may operate at the same wavelength as laser 10, which in the embodiments shown in FIGS. 1 and 2 operates at a wavelength of 532 nanometers. Alternatively, the second laser 47 may operate at shorter wavelengths such as 350 nm to 550 nm, However, in some embodiments the second laser 47 may be substituted by an incoherent light source. For example, a halogen light fed into fiber-optic bundles, can erase within an hour-strike from the erasure.

Ideally, bulk erasure takes four hundred micro-seconds for each page. Bulk erasure of an entire photorefractive crystal 22 may take up to 10 minutes depending upon the volume of the crystal 22. Photorefractive crystals may be a 1 cm cube, 2 cm cube. The term "bulk erasure" means substantially returning the photorefractive crystal 22 to a clean state, leaving no residual recorded data within the crystal. Bulk erasure therefore means all refractive index modulation $\Delta n$ has been reduced to zero, whereby trivalent $Fe^{3+}$ ions have been converted back into their original divalent $Fe^{2+}$ state within the $LiNbO_3$ crystal.

Through usage of the data storage systems 100 and 200, discussed above and shown in FIGS. 1 and 2, holograms may be formed. As referenced above, the technique for forming holograms comprises splitting a highly coherent laser beam into two separate beams, namely the reference beam 6 and the data beam 9. The reference beam 6 is directed onto the holographic storage medium, which is a photorefractive crystal 22, while the data beam 9 is directed onto the object whose image is to be stored. Light from the object is directed to the photorefractive crystal 22 wherein an interference pattern is created owing to the interaction of the reference beam 6 with the light of the data beam 9. In the case of digital data storage media, the data beam 9 is typically reflected from a digital micro-mirror device 52, which may be a spatial light modulator, (for example: Texas Instrument-Digital Mirror Device, DMD) that transports the information to be imaged and directs it to the photorefractive crystal 22 material. Regardless of the application, such as the storage of images as pages of data, subsequently directing a reference beam 6 onto the photorefractive crystal 22 results in a reconstruction of the page representative of the stored digital data.

Figure 6:
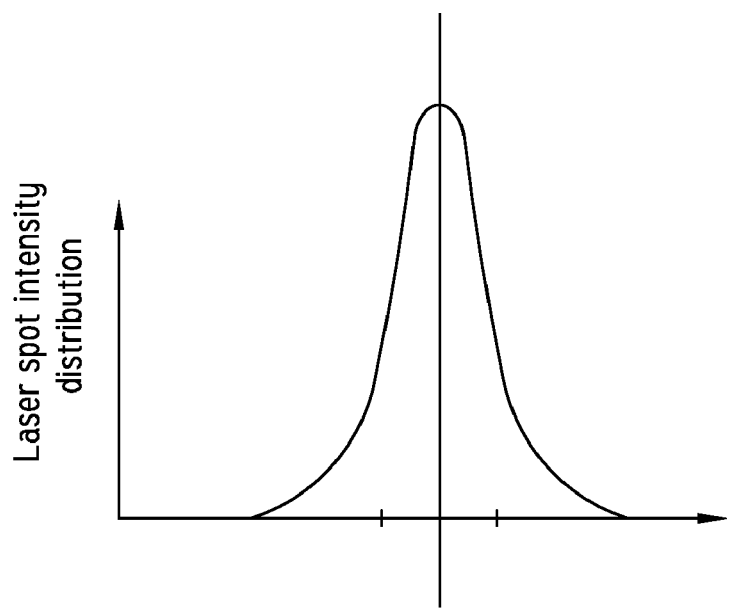
FIGS. 6-10 are graphical depictions of the photorefractive bit data recording mechanism.
Figure 7:
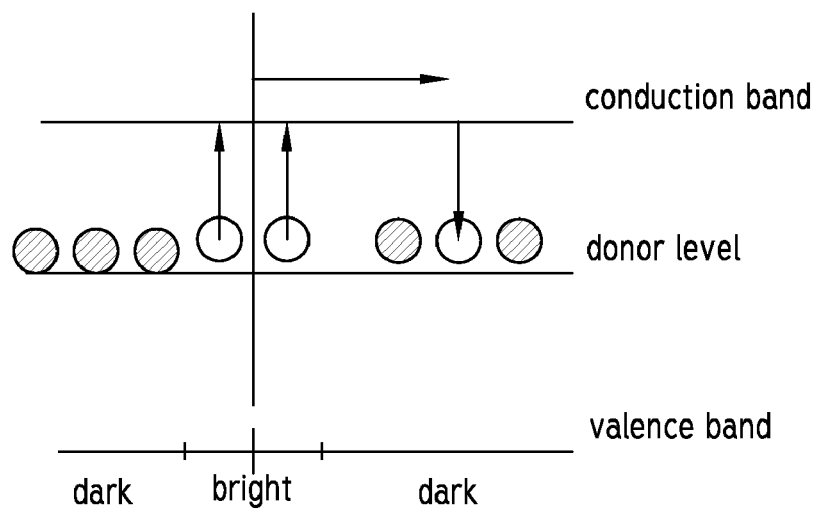
Figure 8:
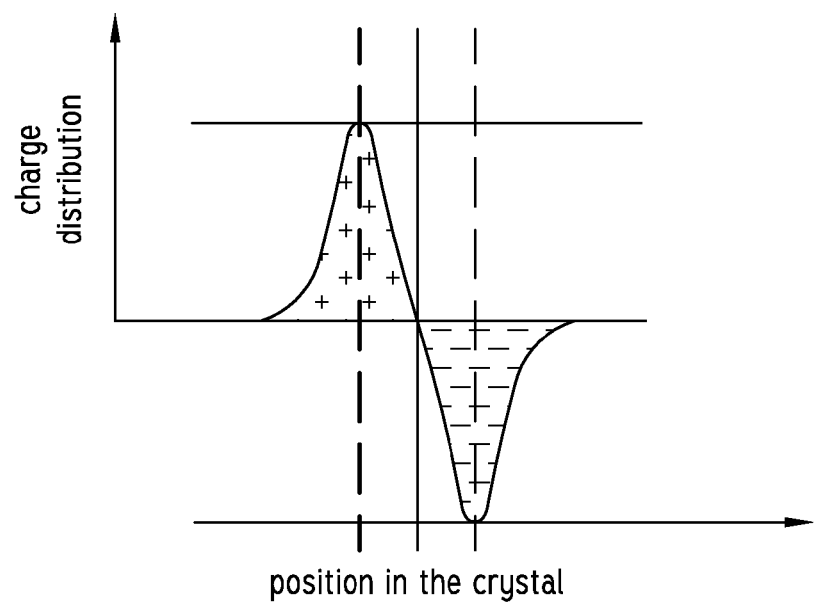
Figure 9:
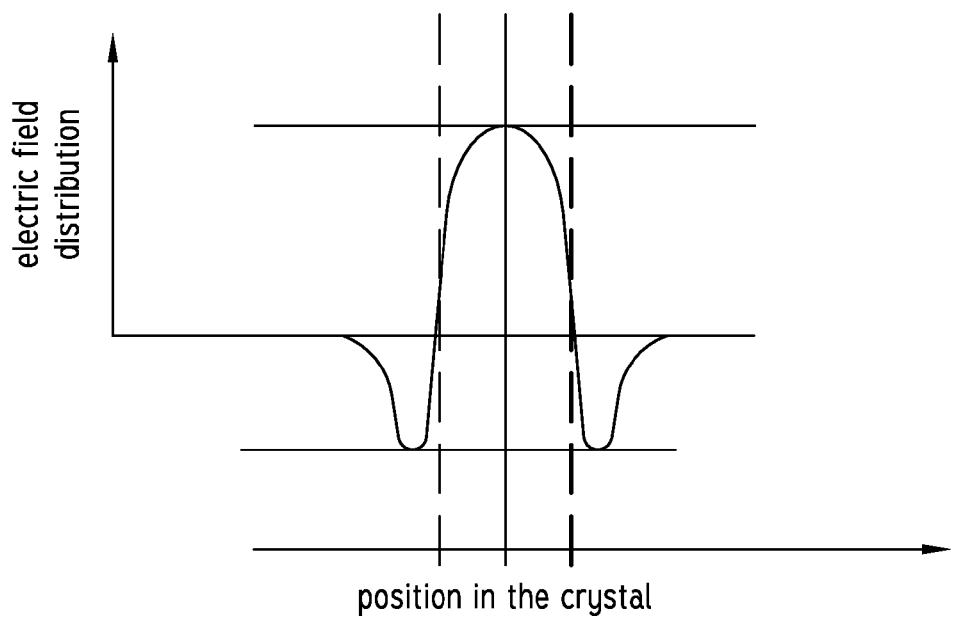
Figure 10:
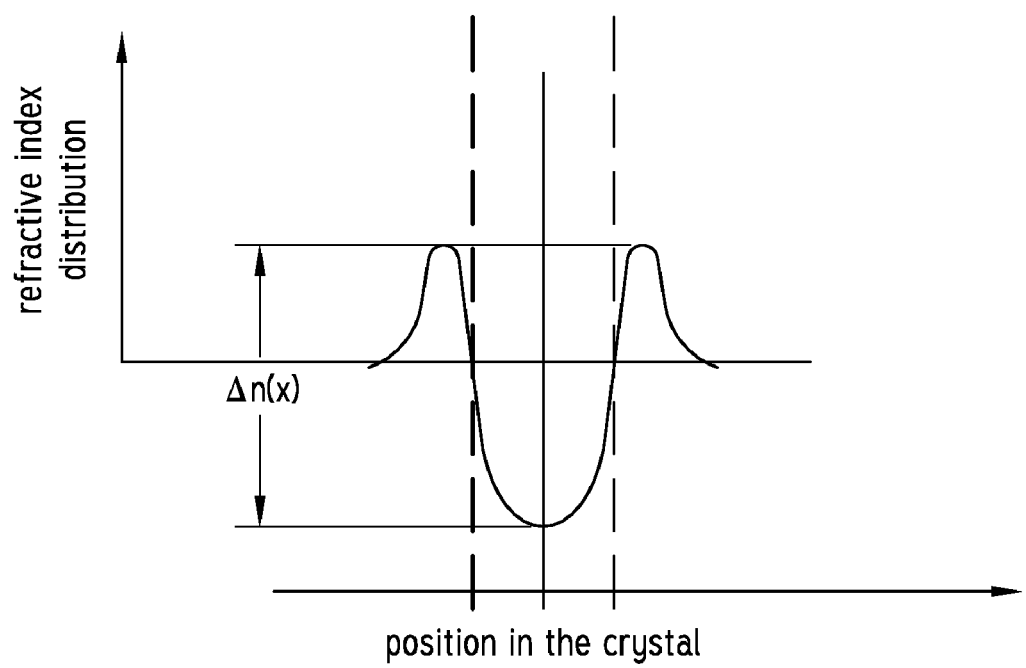

FIGS. 6-10 are graphical depictions of the photorefractive bit data recording mechanism. FIGS. 6-10 depict how the data is recorded on the photorefractive crystal 22. FIG. 6 shows laser spot for one bit incident on the photorefractive crystal 22. FIG. 7 shows photo-ionization, the laser excites electrons in spot vicinity by photon absorption. Excited electrons are re-trapped at vacant donor sites after movement in the conduction band. FIG. 8 shows that electron movement causes non-uniform distribution of charge. FIG. 9 shows that a non-uniform electric field is formed by the charge distribution. FIG. 10 shows that the electric field distribution modulates the local refractive index by the Pockels effect.

Figure 11:
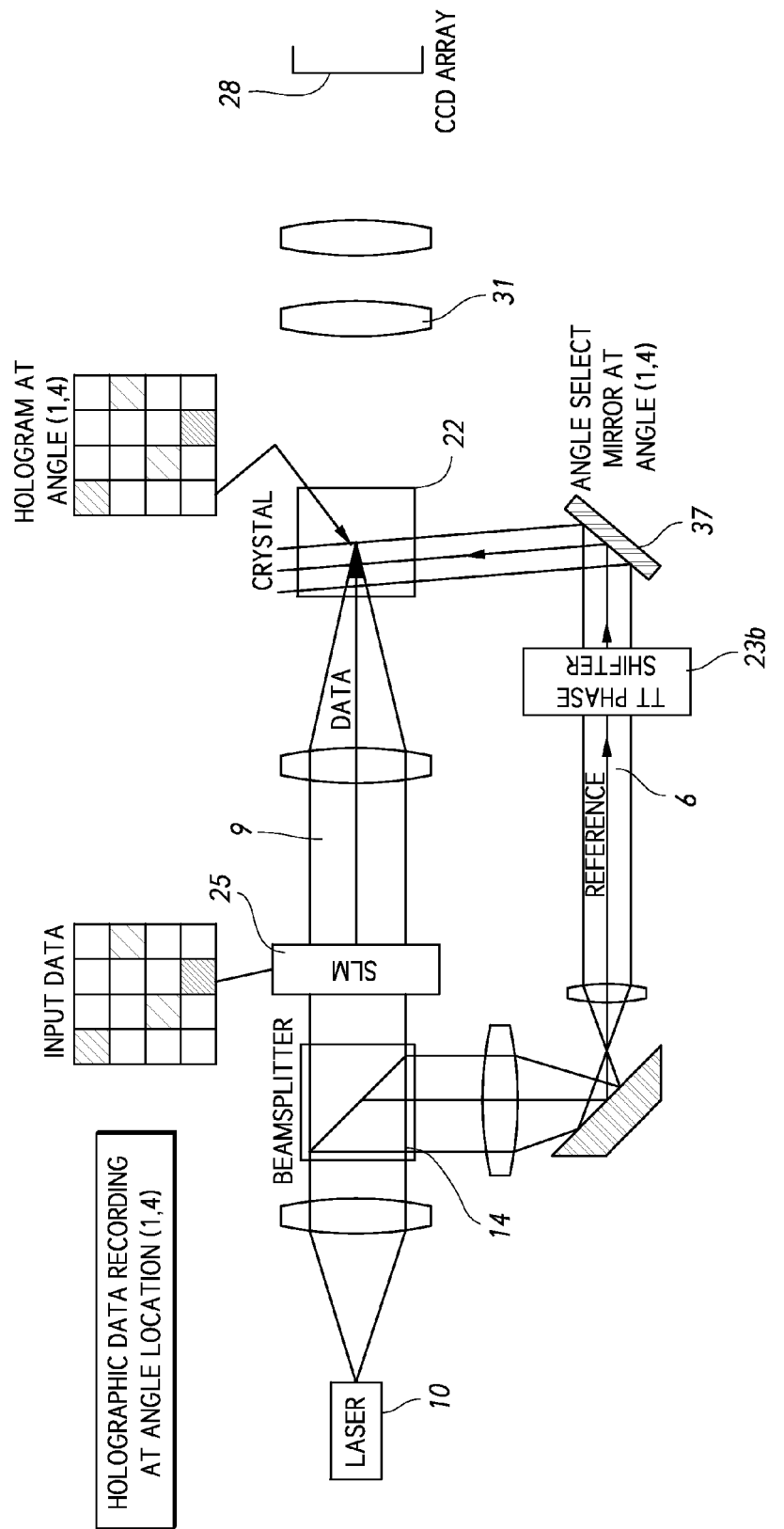
FIG. 11 is a diagram of the holographic data recording and erasure.
Figure 12:
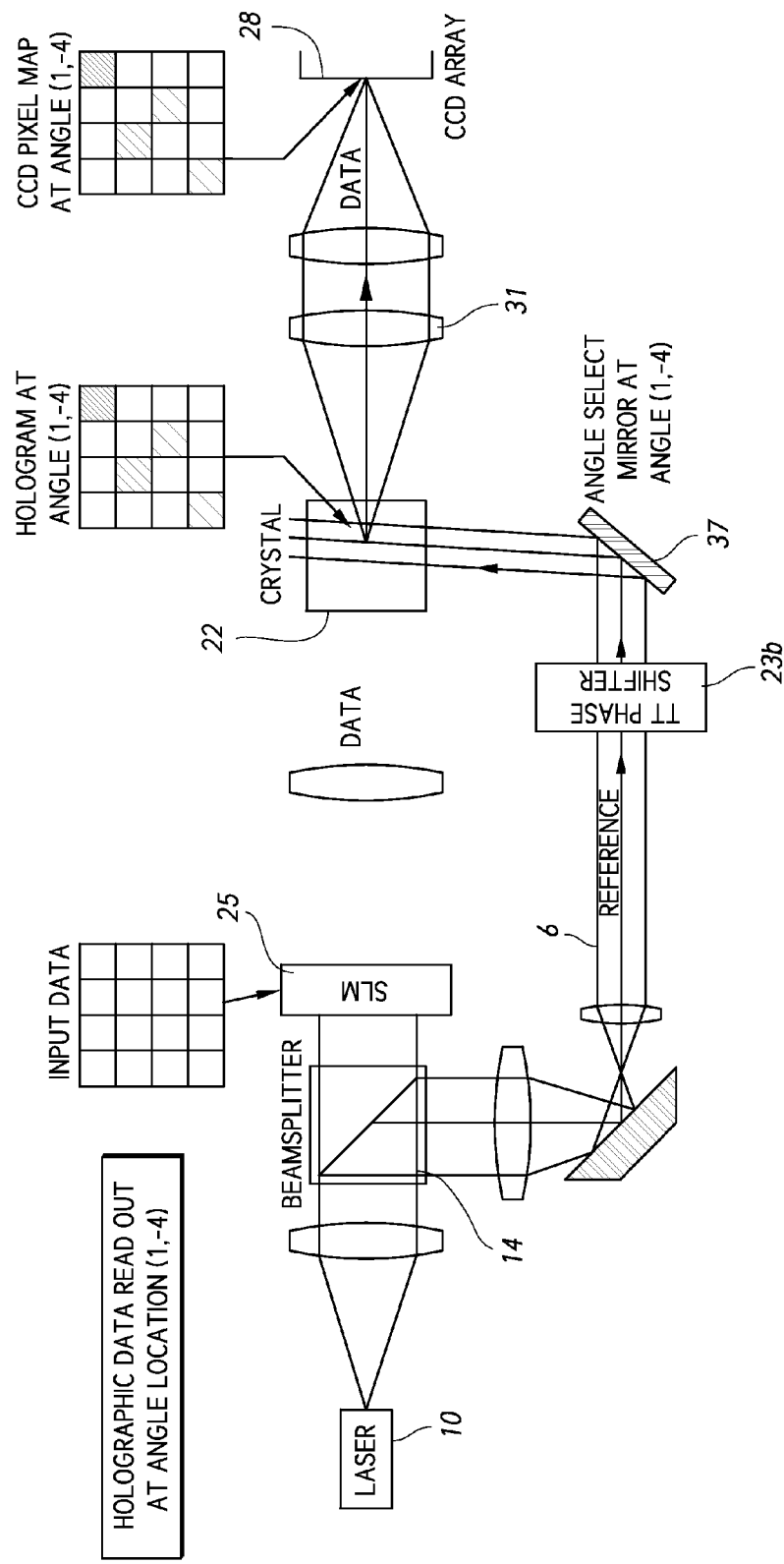
FIG. 12 is a diagram of the holographic data readout.
Figure 13:
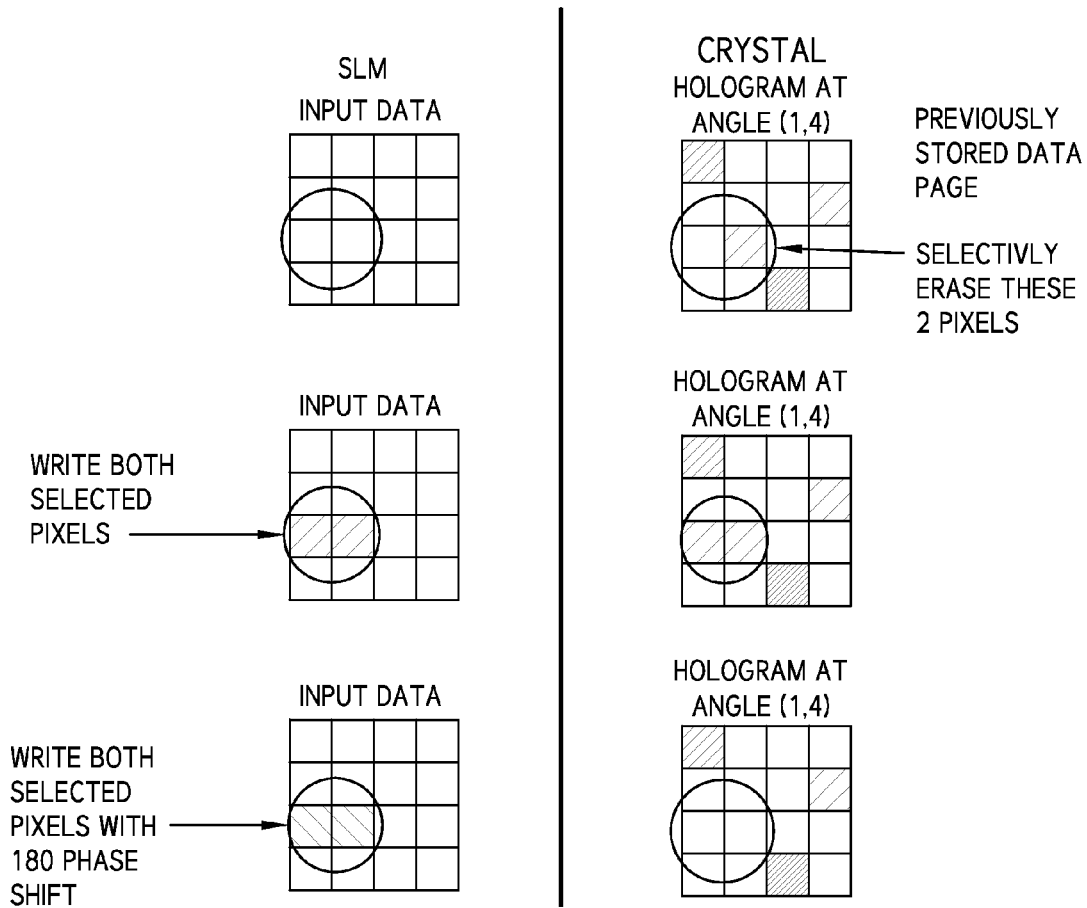
FIG. 13 is a diagram showing holographic erasure.

FIGS. 11-13 are diagrams of the holographic data recording, erasure and readout. Data is shown in a simplified 4×4 array. Each pixel may have 1, 4 or 8 levels of gray scale. The phase of the interferometric hologram for each pixel is indicated by the direction of the cross-hatching in the pixel box. The holographic storage systems 100 and 200 record multiple pages of data by angle multiplexing the reference beam 6 through a dual-angle mirror select.

Depending on the angle of the reference beam 6 used to store data, various pages of data may be stored in the same volume region of the photorefractive crystal 22. To retrieve data stored in the photorefractive crystal 22, the reference beam 6 is projected onto the photorefractive crystal 22 at exactly the same angle that was used to store that page of data. The reference beam 6 is diffracted by the photorefractive crystal 22 thereby allowing the re-creation of the page that was stored at the particular location. The re-created page may then be projected onto a charge-coupled device, such as a CMOS camera 28 that analyzes and forwards the data to a computer. If the reference beam 6 is not projected at exactly the same angle that was used for writing, the page to be retrieved may not be accessed. The angle of the data beam 9 is not changed.

The data is transmitted on the data beam 9 by the digital mirror display 26 and digital micro-minor device 52. The doped photorefractive crystal 22 may be a $LiNbO_3$ crystal.

The data page 40 is read from the photorefractive crystal 22 by the camera 28, which takes the digital pattern of the photorefractive crystal 22 at a given data page 40 and imposes it on the camera 28, and mapping lens assembly 31.

At each angle produced by the angle of the angle generating optical assembly 27 a data page 40 of data is produced by the optical assembly micro-mirror 37 and will be recorded if the phase of the data beam 9 and the reference beam 6 are in a fixed phase relationship. The phase coherence length of the laser beam must be longer than the difference in optical path lengths between the data beam 9 and reference beam 6 paths.

The fixed phase relationship between the data beam 9 and the reference beam 6 must be maintained at any angle/page designation. The permissible optical phase shift error in the reference beam 6 at any angle must be significantly less than one fiftieth of a wavelength.

Figure 14:
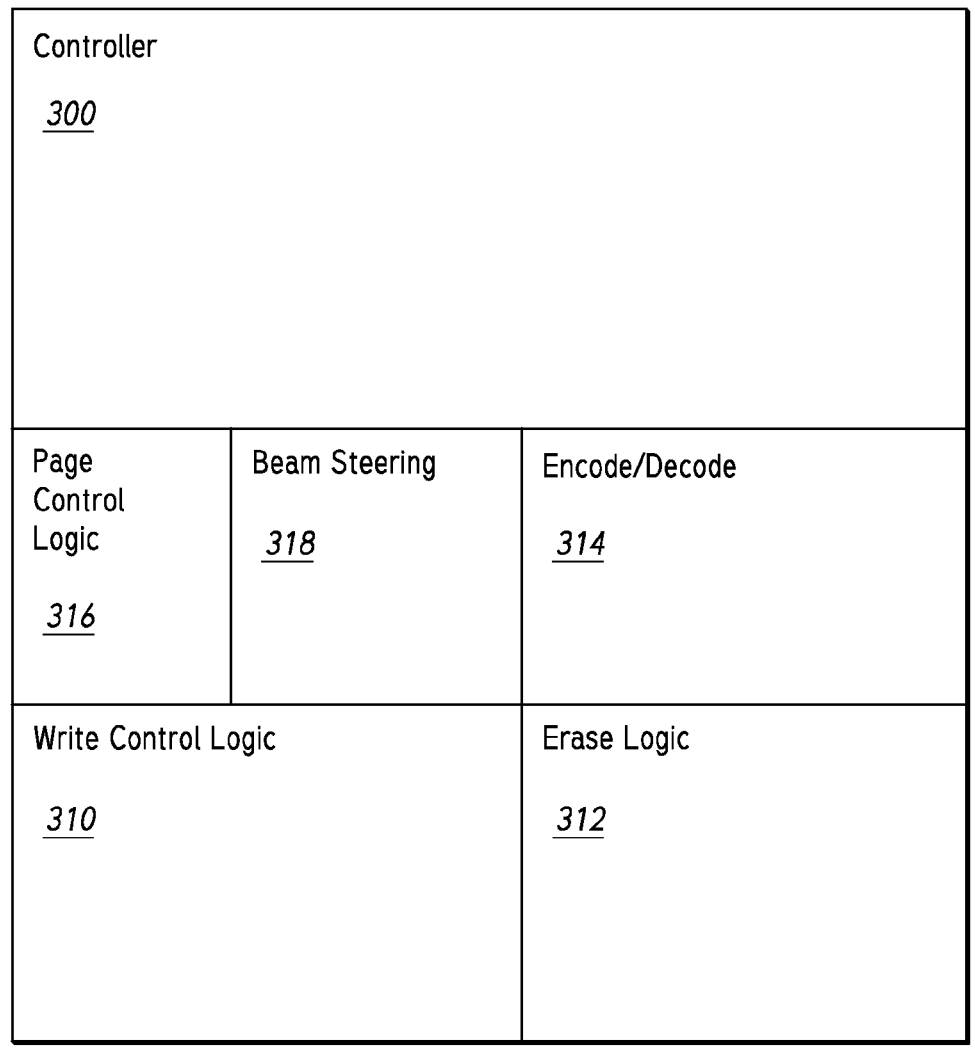
FIG. 14 shows the controller logic of the holographic storage system.
Figure 15:
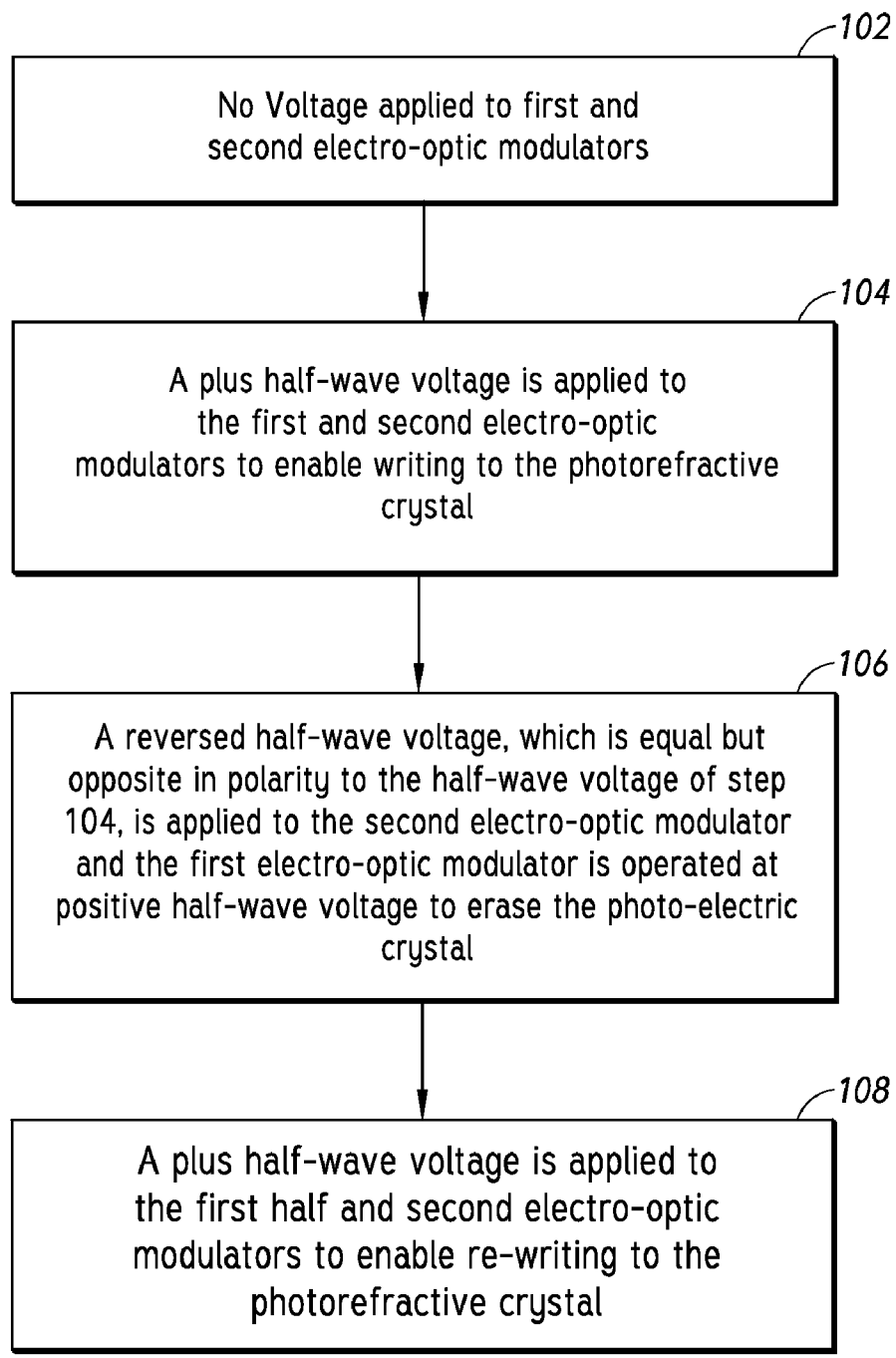
FIG. 15 shows the method for writing to and the erasing of the photorefractive crystal.

Now referring to FIGS. 14 and 15, the controller 300, shown in FIG. 14 applies voltages to the first and second electro-optic modulators 23a, 23b in order to control the writing and erasing to the photorefractive crystal 22. The first electro-optic modulator 23a modulates the phase of the data beam 9, the second electro-optic modulator 23b modulates the reference beam 6. As shown in FIG. 15, in step 102 there is no voltage applied to the first electro-optic modulator 23a and the second electro-optic modulator 23b. When no voltage is applied to them they have no electrically introduced birefringence, so they act together with the pairs of linear polarizers 12b and 12c to reject the pair of horizontally polarized beams directed into them since they are aligned along a vertical plane of polarization. In this state the electro-optic modulators 23a and 23b act as a pair of closed shutters. When voltage is applied a polarized component appears along the vertical axis. When the voltage reaches that for an internal half-wave phase retardance, either modulator together with its corresponding polarizer then acts as a fully-open shutter, at less than half-wave voltage, the effective shutter action is only partial and not fully open.

Still referring to FIG. 15, in this state the electro-optic modulators 23a and 23b act as a pair of closed shutters. In step 104, a plus half-wave voltage is applied simultaneously to both the first electro-optic modulator 23a and the second electro-optic modulator 23b. This produces the necessary phase shift that enables both to operate as open shutter and enable writing and re-writing to the photorefractive crystal 22.

Still referring to FIG. 15, in step 106, the second electro-optic modulator 23b that modulates the reference beam 6 is operated at a reversed (minus) half-wave voltage that is equal but opposite in polarity to how it is used for the writing function in step 104. In step 106 the phase of the reference beam 6 is shifted by 180° for the erase function while the data beam 9 is kept operating at its original plus half-wave voltage.

Still referring to FIG. 15, in step 108, a plus half-wave voltage is applied simultaneously to both the first electro-optic modulator 23a and the second electro-optic modulator 23b. This produces the necessary phase shift that enables both to operate as open shutters and enable re-writing to the photorefractive crystal 22 and achieves the same state as that achieved in step 104.

Alternatively, the same erase function, referred to in step 106, is also enabled if the voltage applied to the second electro-optic modulator 23b preserves its original plus polarity but is increased to plus three times the half-wave voltage used for a write sequence. However, the second electro-optic modulator 23b used in this alternative manner for the erase function must be able to handle three times the applied half-wave voltage. It should be understood that the steps provided above may be performed in any sequence depending upon the needs of the user of the holographic storage system.

In operating in the manner described above the first and second electro-optic modulators 23a and 23b act as high speed shutters in both the write and erase process. This feature allows them to be used together to control the time duration for either data writing or erasure while keeping the laser power at a fixed level.

Highly accurate and reproducible beam positioning devices allow data addressing to be highly reliable. This is achieved by operating the angle generating optical assembly 27 used for guiding the reference beam 6 within a closed electronic loop that provides information to ensure the micro-mirror 37 has settled and is pointing to the right page location.

Figure 3:
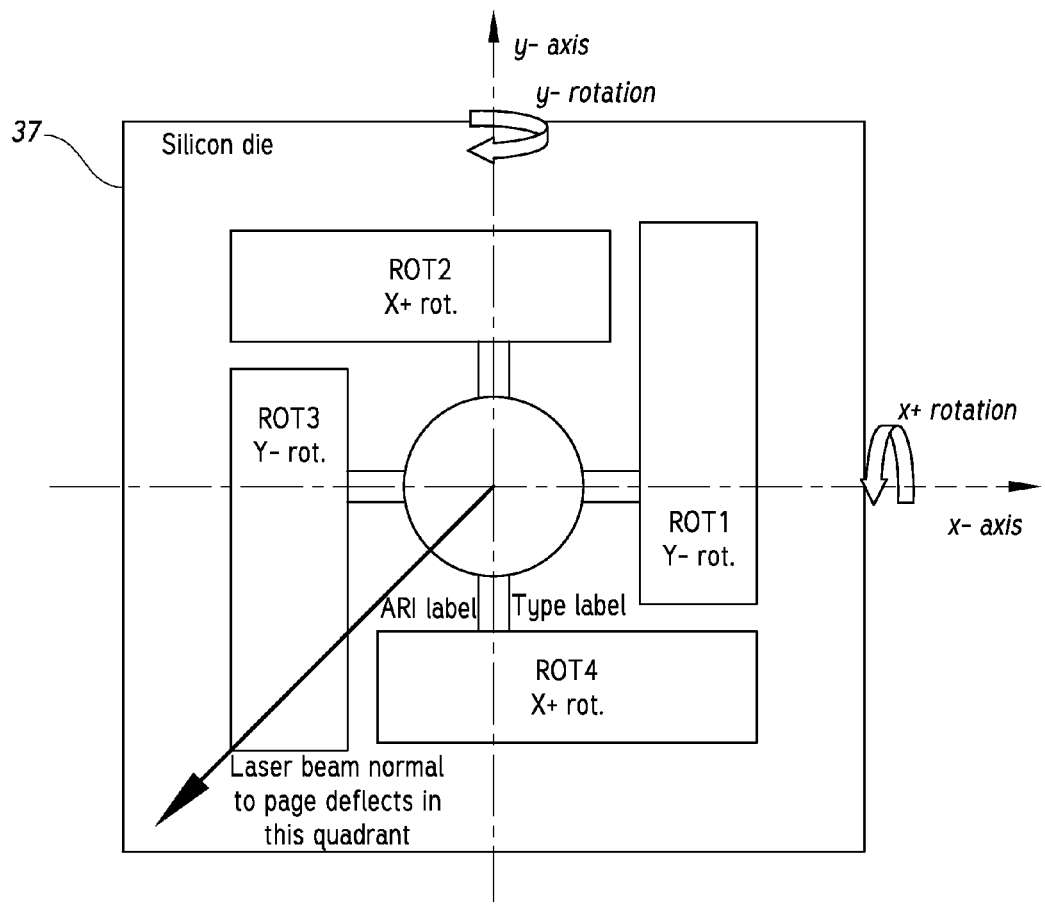
FIG. 3 shows a one quadrant dual-axis MEMS mirror used in the holographic storage system shown in FIG. 1.
Figure 4:
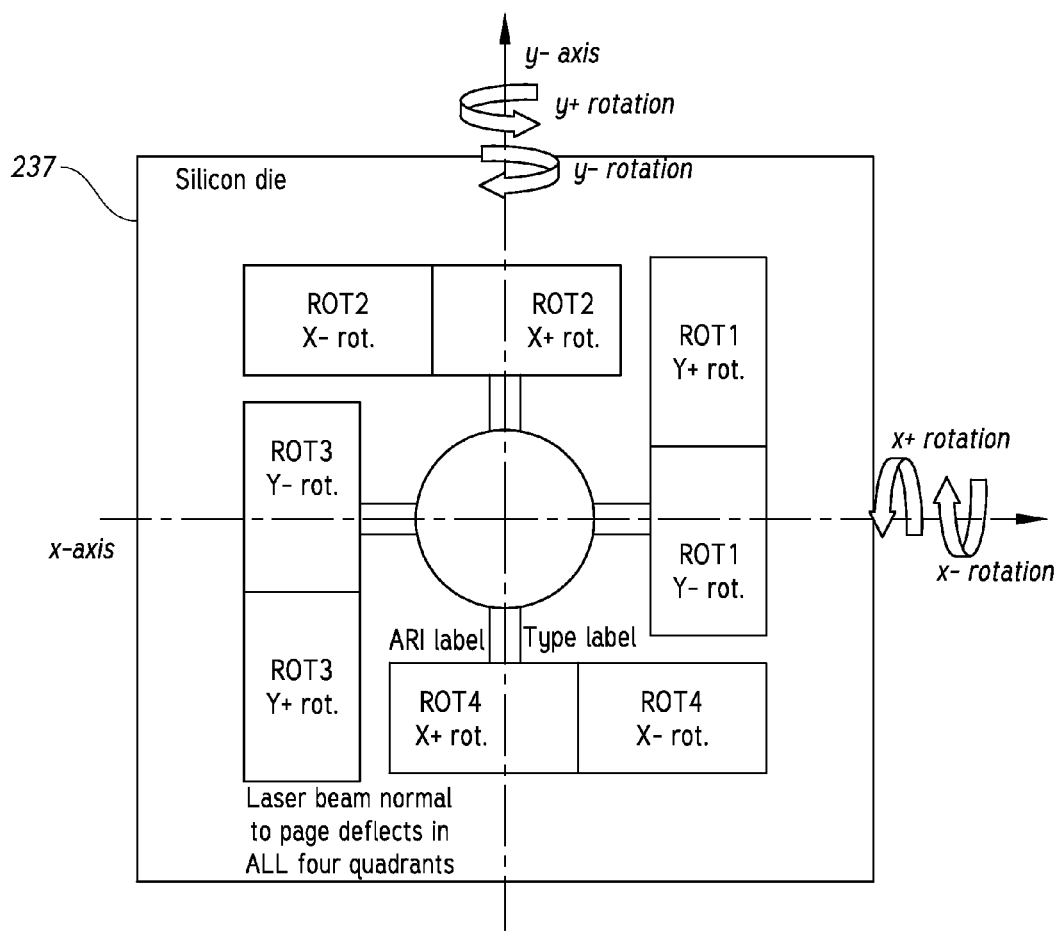
FIG. 4 shows a four quadrant dual-axis MEMS mirror used in the holographic storage system shown in FIG. 2.

Beam steering may be accomplished by using an angle generating optical assembly 27 which uses micro-electro-mechanical system (MEMS) angular multiplexing for holographic application. MEMS mirrors 37 and 237 are shown in FIGS. 3 and 4.

Accurate storing and retrieving of a plurality of pages within the photorefractive crystal 22 is accomplished via angle-multiplexing of the reference beams 6. Such angle-multiplexing generally involves maintaining a constant angle for the data beam 9 with respect to a first axis A of the photorefractive crystal 22. This is shown by the angle θ and is typically 90° with respect to one input face of the photorefractive crystal, while varying the angle of the reference beam 6 with respect to its axis B lying at 90° with respect to axis A. The angle of the reference beam 6 is varied with respect to axis B by two separate, orthogonal angles α and β, directed along a pair of planes X and Y determined by the two independent motions of the beam steering mirror. Also shown in FIG. 16 is the position of the C-axis of the photorefractive $LiNbO_3$ crystal which lies at 45° with respect to axis A, while both of these axes lie within the plane parallel to the direction of polarization of light for both object and reference beams.

It should be understood that the data page 40 is stored in 3D as opposed to 2D. Angle-multiplexing thereby allows a large number of holograms to be stored within a common volume of photorefractive crystal 22, thereby greatly enhancing the storage density thereof.

Figure 16:
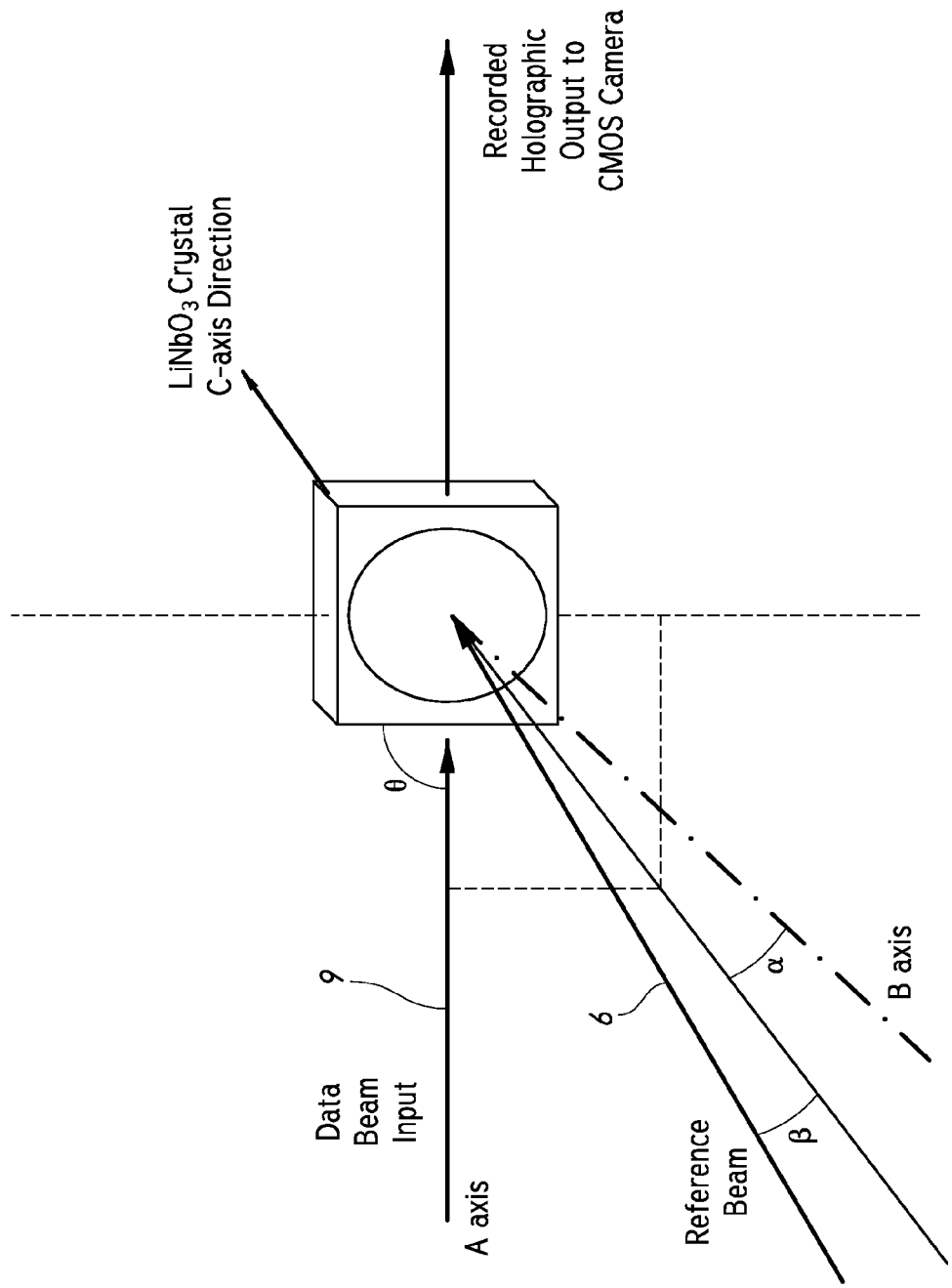
FIG. 16 is a close up view of the area where the reference and data beams impact the photorefractive crystal.

FIG. 16 is a close up view of the area in which the data beam 9 and reference beam 6 strike the photorefractive crystal 22 and more clearly shows the axes A-C and the respective angles by which the reference beam 6 is moved. The orientation of the LiNbO3 photorefractive crystal 22 with its C-axis as shown lies at 45° with respect to the faces where the data beam 9 and reference beam 6 enter. The Pockels effect may be represented by a second-rank tensor, which in turn may be represented in what is called "reduced matrix" form. There are two terms in the Pockels effect that can result in a "permanent" change in refractive index responsible for holographic data storage, namely r13 and r33. These correspond to terms that depend upon which way the input light is polarized. In the embodiment shown, polarized light is projected along the C-axis direction, rather than perpendicular to it, because the term r33 is considerably larger than the term r13. Two beams at right angles are being mixed, so while it may be preferable that the data beam 9 and reference beam 6 come in at 90° to the C-axis, that is not possible. Instead equal angles of 45° with respect to the C-axis are shared, where the effect of r33 is reduced by roughly 0.7071. All of the above means the orientation of the LiNbO3 photorefractive crystal 22 is important for the sake of overall holographic diffraction efficiency. One subtle point is that the selected orientation means the polarized light has only an extraordinary component tilted at 45° with respect to the C-axis. Upon entering the photorefractive crystal 22, extraordinary rays do not obey Snell's Law of refraction. Because of this slight distortions may occur at the corners of the volume storage region in the LiNbO3 photorefractive crystal 11.

The holographic storage system 100 makes use of the commercially available Mirrorcle Technology Gimbal-less design ultra-fast two-axis laser angle generating optical assembly 27 which was developed for several non-holographic applications, including projection displays for vector-graphic projection, 3D Scanning, biomedical imaging and laser engraving.

The use of the angle generating optical assembly 27 device for holographic applications as discussed herein has several advantages. The angle generating optical assembly 27 comprises micro-mirror 37 and tuning mirrors 39a and 39b.

The Gimbal-less design permits ultra-fast two-axis laser beam steering that will scan within ±6 degrees of deflection along two orthogonal directions and settle to within 0.1 percent of full deflection in less than 200 microseconds. This facilitates read/write speeds in the gigabit/sec ranges; the two axis scanning provide complete access to the volume of the photorefractive crystal 22 thereby increasing storage capacity. The angle generating optical assembly 27 is small enough to allow future integration into small form factor for general holographic memory systems. The angle generating optical assembly 27 also has a feedback feature to determine its position and to control its motion.

Figure 17:
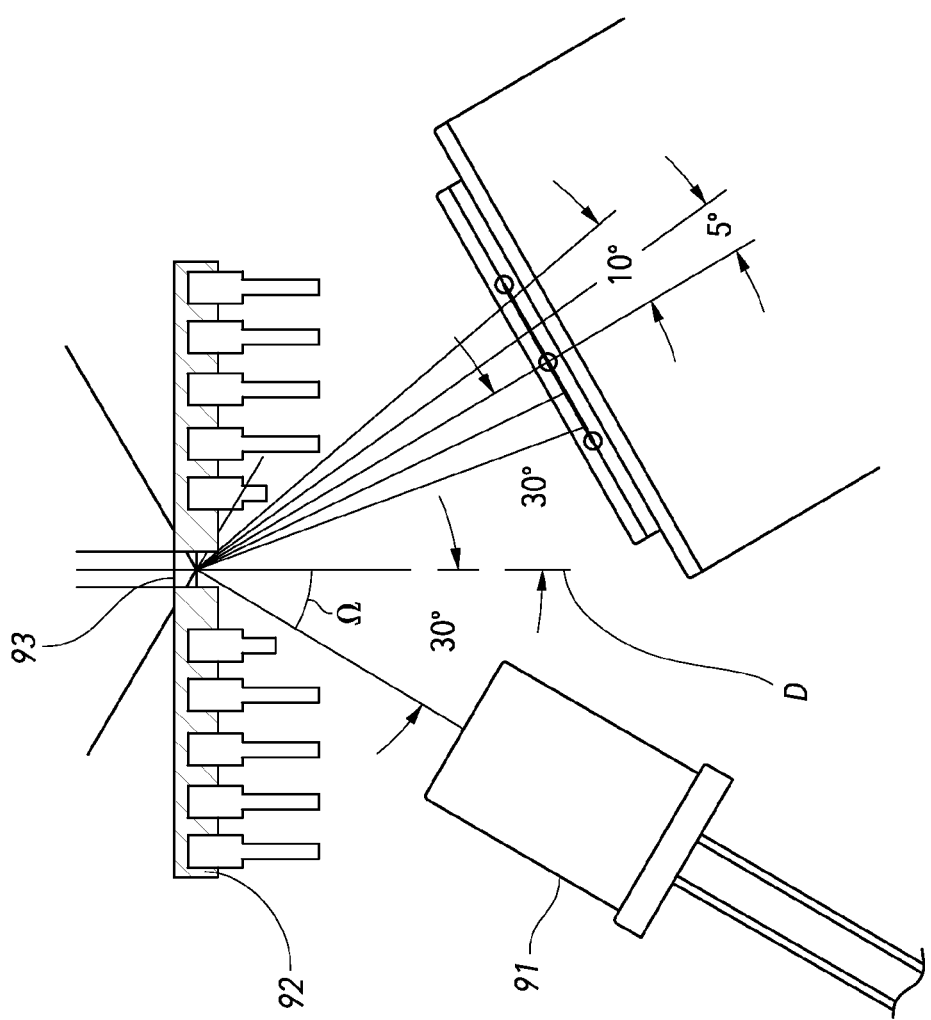
FIG. 17 shows a close up view of the backside of a micromirror.

Angle generating optical micro-mirror 37 is a MEMS beam steering mirror. The reference beam 6 reflects off its front face. As shown in FIG. 17, a semiconductor laser 91 may be located behind the micro-mirror 37 and may direct its own output beam onto the back side 92 of micro-mirror 37 through a small hole 93 provided for that purpose. The separate semiconductor diode laser 91 used in this feedback arrangement is situated at an angle $\Omega$ of 30° with respect to a line D intersecting the small hole 93. The light reflected from the back side 92 of the MEMS micro-mirror 37 is directed in three dimensions onto a quadrant Position Sensing Diode (PSD). Output from the PSD is fed back into the page control logic 316 in the controller 300 which contains a Proportional-Integral-Derivative (PID) controller. The page control logic 316 then outputs the corrected X and Y angle information.

Compared to large-scale galvanometer optical scanners previously used, the angle generating optical assembly 27 requires several orders of magnitude less driving power. Continuous full-speed operation of electro-static actuators help to dissipate less than a few milliwatts of power, allowing such holographic techniques to fit within the domain of green technology.

The optical performance of the angle generating optical assembly 27 must be sufficient so as not to degrade the overall quality of the stored hologram. In general an angle generating optical assembly 27 that achieves the largest angle and the highest operating speed is desirable. In addition, the aperture size and quality are also very important parameters. In order to maximize resolution and to avoid clipping of the beam, usage of larger mirrors is preferred. The micro-mirror 37 may have a diameter of 1.1 millimeters or less. The larger the diameter of the micro-mirror 37, the slower it will be. However, as the micro-mirror 37 is enlarged the inertia of the mirror is increased and for a given spring stiffness the resonant frequency will decrease, thus, reducing speed. The micro-mirror 37 must have good reflectivity in the visible and near infrared ranges; this requires either metallization or a dielectric mirror. The micro-mirror 37 surface should be sufficiently flat as to not distort the beam and must also have surface roughness less than 100 nm at a minimum.

The angle generating optical assembly 27 is operated in a point-to-point optical beam scanning mode to achieve unique resolvable angles. In this mode, a steady-state analog actuation voltage results in a steady-stage analog angle of rotation of the micro-mirror. By allowing the system to tilt ±6 degrees in both x and y direction, it is possible to achieve a total of 9 million or more angles. The one-to-one correspondent actuation voltages and resulting angles are highly repeatable with no degradation over time. Positional precision of the micro-mirrors 37 is at least 14 bits, i.e. within 0.2 milli-degrees.

A sequence of actuation voltages that are properly conditioned results in a sequence of angles for point-to-point scanning. The accuracy of the system 100 is such that it is possible to achieve more than 10 million angles with each angle characteristic of a data page 40.

The angle generating optical assembly 27 may also be operated over a very wide bandwidth from dc to several kilohertz. Angle generating optical assembly 27 with 0.8 mm diameter-sized micro-mirrors 37 are used to achieve angular beam scanning of up to 500 rad/s with first resonant frequency in both axes above 4 kHz. Large angle step response settling times of <100 μs have been demonstrated on devices with micro-mirrors up to 0.8 mm in diameter. Such fast and broadband operation allows data storage and retrieval to be very effective for holographic applications.

It is possible to operate the angle generating optical assembly 27 in a dynamic or resonant mode. When angular multiplexing is achieved by operating near the resonant frequency of a single-crystal silicon used in the angle generating optical assembly 27 one obtains significantly more angle at lower operating voltages and sinusoidal motion. The combination of the springs and the mirror's inertia of the Gimbal-less design of the Mirrorcle technology system, result in a $2^{nd}$ order mass-spring system with a relatively high factor (Q) of 50-100. Therefore, in this mode, low actuation voltages at frequencies in kHz ranges near resonance result in large bi-directional rotation angles allowing for even more massive storage density in holography achieved by the micro-mirror 37. This is shown in FIG. 3.

In other methods of operating the angle generating optical assembly 27, the linear four-quadrant (4Q) micro-mirror 237 is used, shown in FIG. 4, which helps remove ringing effect when voltages are applied to the actuators. This mode leads to a linear voltage vs. angle for higher beam steering accuracy.

Alignment of the micro-mirror 37 of the angle generating optical assembly 27 requires mounting the angle generating optical assembly 27 on a complex positioning system 36. The positioning system 36 is a 6 axis translational stage that allows the angle generating optical assembly 27 to move up-down, left-right and in-out. Ideally, the diameter of the beam impinging upon the angle generating optical assembly 27, must be smaller than the diameter of the micro-mirror 37. For a 0.8 mm diameter micro-mirror 37, the beam diameter is in the order of 0.5 mm, less than $\frac{2}{3}^{rd}$ the mirror size. This is important to avoid run-off from the angle generating optical assembly 27. Run-offs will lead to intensity variation as the beam is steered from one end to the other in both x and y directions. For these reasons, two additional turning mirrors 39a and 39b are used in conjunction with the micro-mirror 37 of the angle generating optical assembly 27 to produce a total deflection of 45° degrees while reducing the maximum angle at the micro-mirror 37 to 15°, which is a MEMS mirror. The forward going beam from the beam steering micro-mirror 37 impinges upon tuning mirror 39a and turning mirror 39b and together establish a relay system before entering the photorefractive crystal 22.

The holographic memory technology enables high-density and high-speed holographic data storage with random access during data recording and readout. An embodiment of the invention utilizes the angle generating optical assembly 27, which is a MEMS (Micro-Electro-Mechanical Systems) beam steering device.

The MEMS angle generating optical assembly 27 is the integration of mechanical elements, sensors, actuators, and electronics placed on a common silicon substrate through micro-fabrication technology. The fabrication method for these micro-mirrors is similar (or identical) to that of a cantilever structure. While the electronics are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electro-mechanical devices MEMS angle generating optical assembly 27.

The MEMS angle generating optical assembly 27 has a micro-mirror 37 that may scan a reference beam 6, which is split from a single collimated laser beam, along a horizontal plane in parallel with the Z axis of the LiNbO$_3$ photorefractive crystal 7. Further, the micro-mirror 37 of the MEMS angle generating optical assembly 27 may be varied by small increments with respect to each new data page 40 so as to specifically orient the reference beam 6 to the photorefractive crystal 22 in an angular multiplexing scheme. Therefore, the micro-mirrors 37 and 237 of the MEMS angle generating optical assembly 27 in this invention are utilized for beam steering in the holographic storage systems 100 and 200.

The holographic storage systems 100 and 200 use a Write Control Logic 310 in the storing of data to the photorefractive crystal 22. The logic used in the recording, reading and erasure of the photorefractive crystal 22 is shown in FIG. 14 as placed on the controller 300. Two versions of the Write Control Logic 310 may be used for the digital micro-mirror device 52, one for the Indirectly Modulated Spatial Light Modulator (IM-SLM) and one for the Directly Modulated Spatial Light Modulator (DM-SLM).

The IM-SLM consists of an array of SLM micro-mirrors 25 as part of the data mirror assembly. Each SLM micro-mirror 25 is individually controlled and represents one unique data point per page. The SLM micro-mirrors 25 are switched between two positions, one which reflects the data beam into the photorefractive crystal 22, hereinafter referred to as the ON position and one which reflects the data beam 9 away from the photorefractive crystal 22, hereinafter referred to as the OFF position. When a SLM micro-mirror 25 is in the ON position, the reflected light from that SLM micro-mirror 25 combines with the reflected light in the photorefractive crystal 22, it combines with the reference beam 6 to write a pixel into the photorefractive crystal 22. The intensity of the pixel is determined by the amount of time that the SLM micro-mirror 25 is in the ON position.

The Write Control Logic 310 sets the SLM micro-mirrors 25 in the sector to be written to the ON position. The Write Control Logic 310 may then command the Erase Module 312 to erase this sector in one of the manners described above. The Write Control Module 310 then sets the pixels of the SLM micro-minors 25 corresponding to the pixels that are to be written to the ON position.

Figure 18:
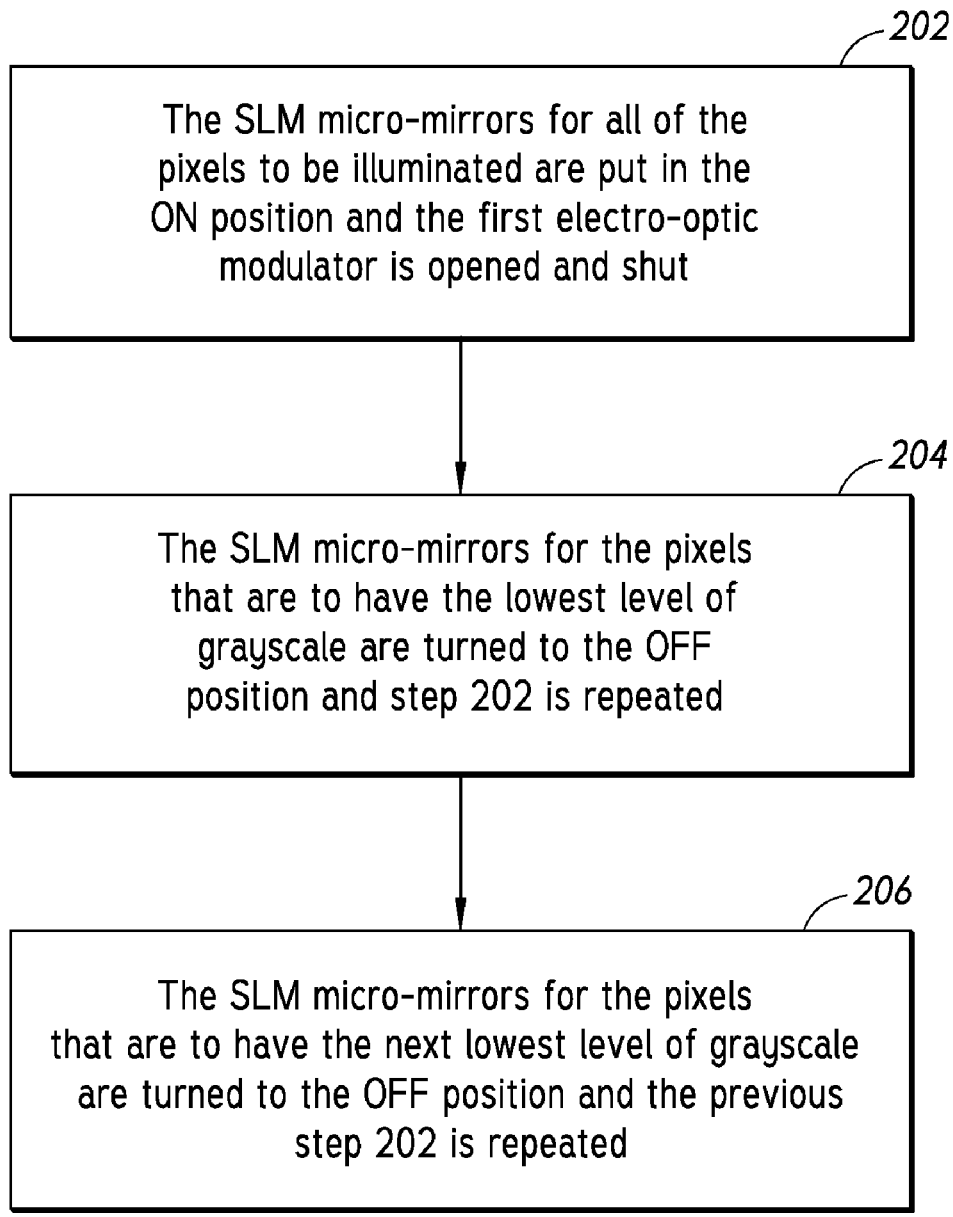
FIG. 18 shows the method for writing to the photorefractive crystal.

The first electro-optic modulator 23a is opened and the sector in written to. To obtain grayscale, the step of setting the SLM micro-minors 25 in the sector to be written to the ON position is repeated several times as follows: In FIG. 18, is the method for writing to the photorefractive crystal 22 shown. In step 202, the SLM micro-minors 25 for all of the pixels to be illuminated are put in the ON position and the first electro-optic modulator 23a is opened and shut. In step 204, the SLM micro-minors 25 for the pixels that are to have the lowest level of grayscale are turned to the OFF position and step 202 is repeated. In step 206, the SLM micro-mirrors 25 for the pixels that are to have the next lowest level of grayscale are turned to the OFF position and the previous step 202 is repeated. These steps are repeated for all grayscale levels.

DM-DSLM also uses a Write Control Logic 310. The holographic data storage system 100 of the present invention also has an Encode/Decode Logic 314. The Encode/Decode Logic 314 may be located within the controller 300, which may be an embedded processor. The Encode/Decode Logic 314 converts the most significant portion of the address field of the read or write command received from the system interface to the appropriate angles sent to the Page Control Logic 316. The Encode/Decode Logic 314 selects which sector will be written to or read from the photorefractive crystal 22.

In U.S. Pat. No. 6,944,110, MEMS technology has been extended to integration on many mirrors on the same chip, arranged in an array. Based on this technology, each minor, connected with a micro-machine electrical actuator, may be independently tilted so that the independent light beam is reflected in the desired direction. Thus, an array of N mirrors would direct N optical input signals impinging on them, to reflect to N position in space.

Using specific MEMS digital micro-minor device 52 the angle of both the data beam 9 and the reference beams 6 have been defined and directed onto the photorefractive crystal 22. When a specific voltage is applied to each SLM micro-mirror 25 in the array of an actuator, the SLM micro-mirrors 25 are deflected at different angles.

The holographic storage systems 100 and 200 will permit read/write with no moving parts. The position of the SLM micro-mirror 25 relative to the photorefractive crystal 22 corresponds to the dual angles addressed by the MEMS mirror control voltages for the x-axis direction and the y-axis direction. Concurrently, by superimposing the reference beam 6 onto the data beam 9 the data can be stored as an interference pattern in a specific location in the photorefractive crystal 22.

Reading occurs by blocking the data beam 9 and projecting onto the material the reference beam 6 at the page angle used during writing that page. This is achieved by applying the corresponding voltages for the x-axis and y-axis directions for that particular page.

Because the mirror digital micro-mirror device 52 itself does not have to be rotated, it has the potential for faster read time, higher fidelity and no moving parts.

However, the holographic storage system 100 may suffer from high speed data manipulation. A very precise algorithm must be used for read and write operations. For example, one must initiate specific commands such as: not read/write at the same location at the same time, and with the OFF states blocked. This requires prioritizing read/write sequences and therefore implies arbitration and memory location lock. In view of the limitations of the prior art, the present invention provides for the use of MEMS (Micro-electro-mechanical Systems) mirror technology for high-speed beam steering in a compact holographic system.

One or more embodiments of the invention may also make use of digital micro-mirror device 52, which is used frequently as a spatial light modulator. Due to its superior switching speed, contrast ratio, and overall maturity, a digital micro-mirror device 52 is useful for holographic media. Digital micro-mirror device 52 can be used in a static mode for high-speed beam steering. The selection of a SLM micro-mirror 25 from the array of mirrors in the holographic storage system 100 that uses digital micro-mirror device 52, can provide a means for the reference beam 6 to address a specific location in the photorefractive crystal 22. Therefore, another alternative to the angle generating optical assembly 27 presented herein is the high-speed scanning mirror that utilizes the light deflection of the digital micro-mirror device 52 instead of diffraction as the angle generating optical assembly 27.

The Erase Logic 312 changes the phase of the reference beam 6. It can use either a first or second electro-optic modulator 23a and 23b on the data or on the reference path. In this situation the first and second electro-optic modulator 23a and 23b are half wave phase shifters With Beam Steering Control 318, the controller 300 converts the address from the read or write command from the system interface to an X axis and a Y axis angle. There are two forms of Beam Steering Control 318, one for angle generating optical assembly 27 and one for acousto-optical beam steering. For the beam steering mirror case, the beam steering interface converts the X and Y angles to numerical outputs to DACs. For the acousto-optical case, the angle that the beam is deflected is proportional to the frequency of the driving voltage. The Beam Steering Control 318 will output a square wave at the appropriate frequency.

Angle multiplexing may be summarized as follows, current art read and write pages are focused on resolvable spots generated by the angle generating optical assembly 27. Quality of the steering device is determined by the resolvable angles, small angles, hysteresis, switching and reflectivity.

The holographic data readout may be summarized as follows: the holographic storage system 100 and 200 permits independent retrieval of data pages. The data beam 9 is turned off. The reference beam 6 dual-angle of incidence to the photorefractive crystal 22 is selected. A reproduction of the holographic page is mapped onto PDA. The entire page may be read immediately and the selected data is retrieved from the page.

Several types of noise can corrupt information gathered when reading data on a given page. This noise may be divided into two types: systematic noise due to photorefractive crystal defects, magnification defects between mirror array and detector array and other focusing defects; or random noise due to speckle, interpixel noise, interpage crosstalk, detector shot noise, thermal noise and unwanted scattered light. While systematic noise can be filtered or compensated, random noise will set limits on holographic reading precision which are addressed by specifying required diffraction efficiency η to achieve a given signal-to-noise ratio SNR, on readout at a specified rate for a specified bit error rate BER. To achieve these results, an error correction code ECC is also introduced into the encoding/decoding method used.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A holographic storage system with bulk erasing comprising:
a photorefractive crystal for storing and retrieving a plurality of pages; a first laser for providing a reference beam and a data beam for storing the plurality of pages on the photorefractive crystal;
and a second laser for bulk erasing the plurality of pages; wherein the second laser illuminates the photorefractive crystal at a range of divergence angles.

2. The system of claim 1, wherein the second laser illuminates the photorefractive crystal with un-polarized light.

3. The system of claim 1, wherein the first laser operates at a wavelength of approximately 532 nanometers.

4. The system of claim 1, wherein the second laser operates at a wavelength of approximately 532 nanometers.

5. The system of claim 1, wherein the second laser operates at a wavelength that is less than operational wavelength of the first laser.

6. The system of claim 1, wherein the second laser operates at substantially the same wavelength as the operational wavelength of the first laser.

7. The system of claim 1, wherein the photorefractive crystal comprises $LiNbO_3$.

8. The system of claim 1, wherein the plurality of pages on the photorefractive crystal are removed after operation of the second laser.

9. The system of claim 1, further comprising a Micro-Electro-Mechanical System angle generating optical assembly for angle-multiplexing the reference beam.

10. A method of bulk erasure in a holographic storage system comprising:
providing a first laser; a photorefractive crystal; and a second laser;
storing a plurality of pages with the first laser on the photorefractive crystal;
illuminating the photorefractive crystal with the second laser, wherein the illumination bulk erases the plurality of pages; and
wherein the second laser illuminates the photorefractive crystal at a range of divergence angles.

11. The method of claim 10, wherein the second laser illuminates the photorefractive crystal with un-polarized light.

12. The method of claim 10, wherein the first laser operates at a wavelength of approximately 532 nanometers.

13. The method of claim 10, wherein the second laser operates at a wavelength of approximately 532 nanometers.

14. The method of claim 10, wherein the second laser operates at a wavelength that is less than operational wavelength of the first laser.

15. The method of claim 10, wherein the second laser operates at substantially the same wavelength as the operational wavelength of the first laser.

16. The method of claim 10, wherein the photorefractive crystal comprises $LiNbO_3$.

17. The method of claim 10, wherein the first laser forms a data beam and a reference beam.

18. A holographic storage system with bulk erasing comprising:
a photorefractive crystal for storing and retrieving a plurality of pages;
a first laser for providing a reference beam and a data beam for storing the plurality of pages on a photorefractive crystal; and
a second laser for bulk erasing the plurality of pages a digital micro-minor device for reflecting the data beam;
a Micro-Electro-Mechanical System angle generating optical assembly for angle-multiplexing the reference beam;
a camera for reading out the plurality of pages; and
wherein a plurality of pages on the photorefractive crystal are removed after operation of the second laser.

* * * * *